(12) United States Patent
Friedl et al.

(10) Patent No.: US 7,523,069 B1
(45) Date of Patent: Apr. 21, 2009

(54) ASSESSING AND/OR DETERMINING OF USER AUTHORIZATIONS USING A TRANSPONDER, A FINGER PRINT RECOGNITION ROUTINE OR THE LIKE

(75) Inventors: Helmut Friedl, Sipbachzell (AT); Josef Feichtinger, Thalheim bei Wels (AT); Manuel Rumpl, Sipbachzell (AT); Martin Mitterhauser, Ried im Traunkreis (AT); Franz Niedereder, Fischlham (AT)

(73) Assignee: Fronium International GmbH (AT)

( * ) Notice: Subject to any disclaimer, the term of this patent is extended or adjusted under 35 U.S.C. 154(b) by 524 days.

(21) Appl. No.: 10/129,447

(22) PCT Filed: Nov. 6, 2000

(86) PCT No.: PCT/AT00/00289

§ 371 (c)(1),
(2), (4) Date: Sep. 27, 2002

(87) PCT Pub. No.: WO01/34337

PCT Pub. Date: May 17, 2001

(30) Foreign Application Priority Data

Nov. 5, 1999 (AT) .................................... 1861/99
Nov. 2, 2000 (AT) ............................. A 1860/2000

(51) Int. Cl.
*G06F 11/30* (2006.01)
*G06F 12/14* (2006.01)
*H04L 9/32* (2006.01)

(52) U.S. Cl. .......................... 705/50; 713/186; 382/115; 219/78.01

(58) Field of Classification Search .................... 705/50; 713/182–186; 902/1–5; 382/115–128; 901/42; 219/54–146, 617
See application file for complete search history.

(56) References Cited

U.S. PATENT DOCUMENTS 3,452,214 A 6/1969 Martin
4,301,351 A * 11/1981 Mathews .................... 219/114

(Continued)

FOREIGN PATENT DOCUMENTS

DE 25 33 699 2/1977

(Continued)

OTHER PUBLICATIONS

Albert, "Added Value Welded In", Jun. 1994, Modern Machine Shop, v67, n1, p. 80 (8).*

*Primary Examiner*—Mary Cheung
(74) *Attorney, Agent, or Firm*—Lerner, David, Littenberg, Krumholz & Mentlik, LLP

(57) ABSTRACT

The invention describes a welding device (1) or a current source (2), with a control system (4), preferably comprising a microprocessor controller with a memory unit, a power component (3), in particular a current-inverting source, and additional components such as a welding torch (10), a wire feed device (11), etc., which are connected to the welding device (1) or the current source (2) via appropriate interfaces. An add-on module (27) is connected to the control system (4) or to the current source (2) for identifying a person by means of biometric physical characteristics such as an electronic fingerprint, voice recognition, iris recognition, recognition of a facial shape, recognition of writing, etc. or alternatively a transponder code via a transponder system.

16 Claims, 3 Drawing Sheets

U.S. PATENT DOCUMENTS

| | | | |
|---|---|---|---|
| 4,641,292 A | 2/1987 | Tunnell et al. | |
| 4,801,781 A | 1/1989 | Hori et al. | |
| 4,945,210 A | 7/1990 | Yoshimura | |
| 5,418,525 A | 5/1995 | Frei et al. | |
| 5,479,530 A | 12/1995 | Nair et al. | |
| 5,512,726 A | 4/1996 | Arantes et al. | |
| 5,559,504 A | 9/1996 | Itsumi et al. | |
| 5,719,950 A * | 2/1998 | Osten et al. | 382/115 |
| 6,084,977 A * | 7/2000 | Borza | 382/124 |
| 6,219,439 B1 * | 4/2001 | Burger | 382/115 |
| 6,507,662 B1 * | 1/2003 | Brooks | 382/115 |
| 6,567,539 B1 * | 5/2003 | Benezeth | 382/124 |
| 6,957,337 B1 * | 10/2005 | Chainer et al. | 713/186 |

FOREIGN PATENT DOCUMENTS

| | | | |
|---|---|---|---|
| DE | 32 16 389 | | 11/1983 |
| DE | 42 30 281 A1 | | 9/1993 |
| DE | 44 14 216 | | 4/1995 |
| DE | 197 49 090 A1 | | 5/1999 |
| EP | 0 496 344 B1 | | 7/1992 |
| EP | 0 629 764 | | 6/1994 |
| EP | 0 673 704 A1 | | 9/1995 |
| EP | 0 772 184 | | 10/1996 |
| EP | 0 924 656 A2 | | 6/1999 |
| EP | 1 010 490 A1 | | 6/2000 |
| EP | 1 025 946 A1 | | 8/2000 |
| FR | 2 711 871 | | 5/1995 |
| GB | 2312040 A | * | 10/1997 |
| JP | 09305816 | | 11/1997 |
| JP | 10055443 | | 2/1998 |
| WO | WO 98/50875 | | 11/1998 |
| WO | WO 99/23614 | | 5/1999 |

\* cited by examiner

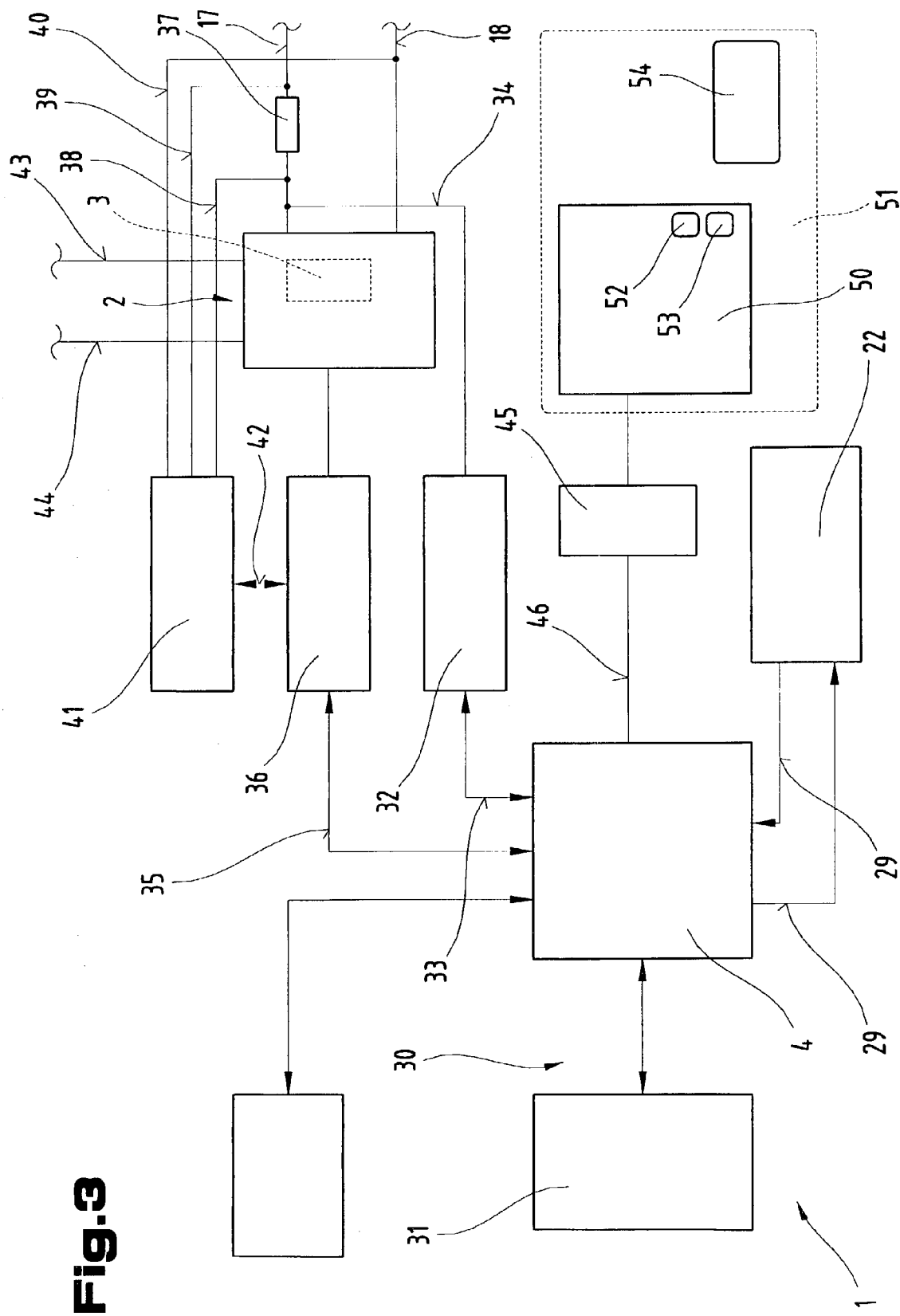

ASSESSING AND/OR DETERMINING OF USER AUTHORIZATIONS USING A TRANSPONDER, A FINGER PRINT RECOGNITION ROUTINE OR THE LIKE

CROSS REFERENCE TO RELATED APPLICATIONS

Applicants claim priority under 35 U.S.C. §119 of Austrian Application Nos. A 1861/99, filed on Nov. 5, 1999, and A 1860/2000, filed on Nov. 2, 2000. Applicants also claim priority under 35 U.S.C. §120 of PCT/AT00/00289, filed on Nov. 6, 2000. The international application under PCT article 21(2) was not published in English.

BACKGROUND OF THE INVENTION

1. Field of the Invention

The invention relates to a method of setting up authorisations and allocating personalised welding settings.

2. Description of Related Art

Welding devices or current sources are known in which an access and anti-theft security system is operated in conjunction with key-operated switches or by entering pin codes.

The disadvantage of these systems is that it is necessary to issue and administer various numbers of keys to use a key-operated switch. It is also necessary to provide a secure place in which to store the keys. If a key is lost, a replacement has to be ordered and there will be a considerable period during which the user is generally required to use the welding device with another key, which means that he is unable to use his personal welding settings. Another major disadvantage is the fact that only one type of key is available, which means that it is not possible to issue authorisations to user groups.

On the other hand, the disadvantage of using a welding device which operates by entering a pin code, in other words a password, is that an input and/or output device is required for entry purposes and this feature is not provided on all welding devices or current sources, especially those in which the input and/or output device is an add-on component. Another major disadvantage resides in the fact that the passwords must not be forgotten because access will have to be given to primary systems or higher-ranking persons in the event of an emergency situation.

Several devices are known from Document D1 — U.S. Pat. No. 5,559,504 A — in particular for a telephone, a computer, an identity card, chip card or magnetic card, a car or a motor bicycle, which have an add-on module for identifying persons on the basis of biometric physical characteristics by means of a fingerprint sensor, whereby a validly identified person is permitted use of the device.

Document D2 — U.S. Pat. No. 4,945,210 A — discloses a soldering device with an add-on module for identifying a user by means of a card for recognising an identification element. In this instance, the user must insert a card in an integrated card reader in order to be able to switch on the soldering device and if the card code of the user is correct, the temperature of the soldering device can be changed.

Document D3 — FR 2 711 871 — discloses a standard configuration of a welding device, whereby the welding device has a control system, preferably comprising a microprocessor controller with a memory unit, a power component, in particular a current-inverting source, and additional components such as a welding torch, a wire feed device, which are connected to the welding device or the current source by appropriate interfaces.

The underlying objective of the invention is to propose a welding device or a current source with a method of setting authorisations and allocating personalised welding settings, which provides reliable protection against theft and/or enables personalised welding settings to be allocated independently of any mechanical components or the mental recollection of an individual.

BRIEF SUMMARY OF THE INVENTION

The advantage of this system is that the user can readily start up the welding system or welding device and can then access his personalised in welding settings or welding data without any other user being able to access these settings or data. Another advantage resides in the fact that operation is specific to individual persons, which means that welding logs can be kept.

The advantage of this approach is that operation can be conveniently started and personalised welding settings retrieved using a compact, dust-proof unit which the user of the welding device can easily carry around.

BRIEF DESCRIPTION OF THE DRAWINGS

The invention will be described in more detail by reference to an embodiment.

Of the drawings,

FIG. 3 is a simplified, schematic block diagram showing a configuration of a welding system and a welding device.

DETAILED DESCRIPTION OF THE INVENTION

Firstly, it should be pointed out that same parts of the embodiments described as examples are shown by the same reference numbers. Details of position given with respect to the embodiments may be transposed in terms of meaning to other positions when a different position is being described.

Figure 1:
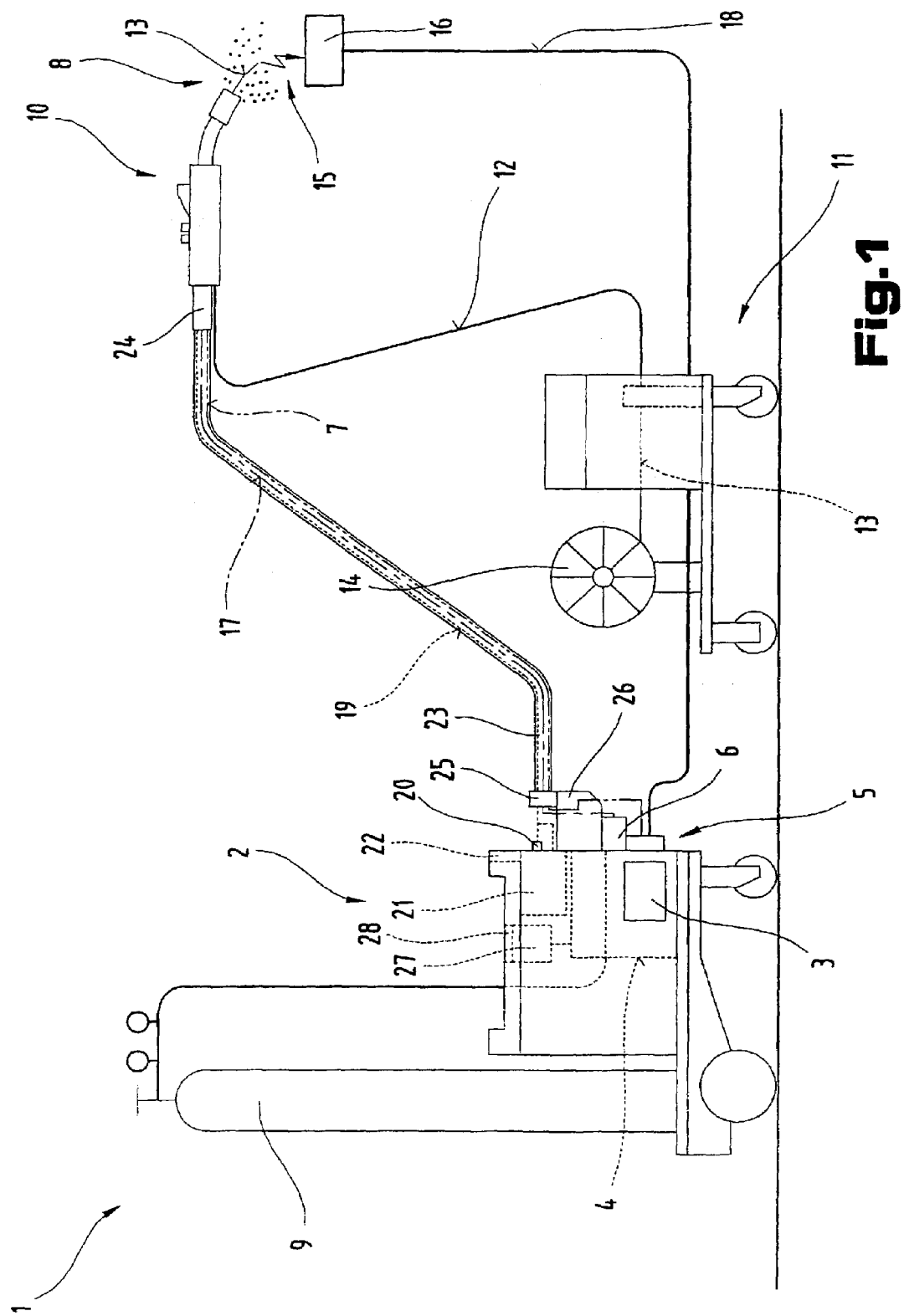
FIG. 1 is a schematic diagram of a welding system and a welding device.
Figure 2:
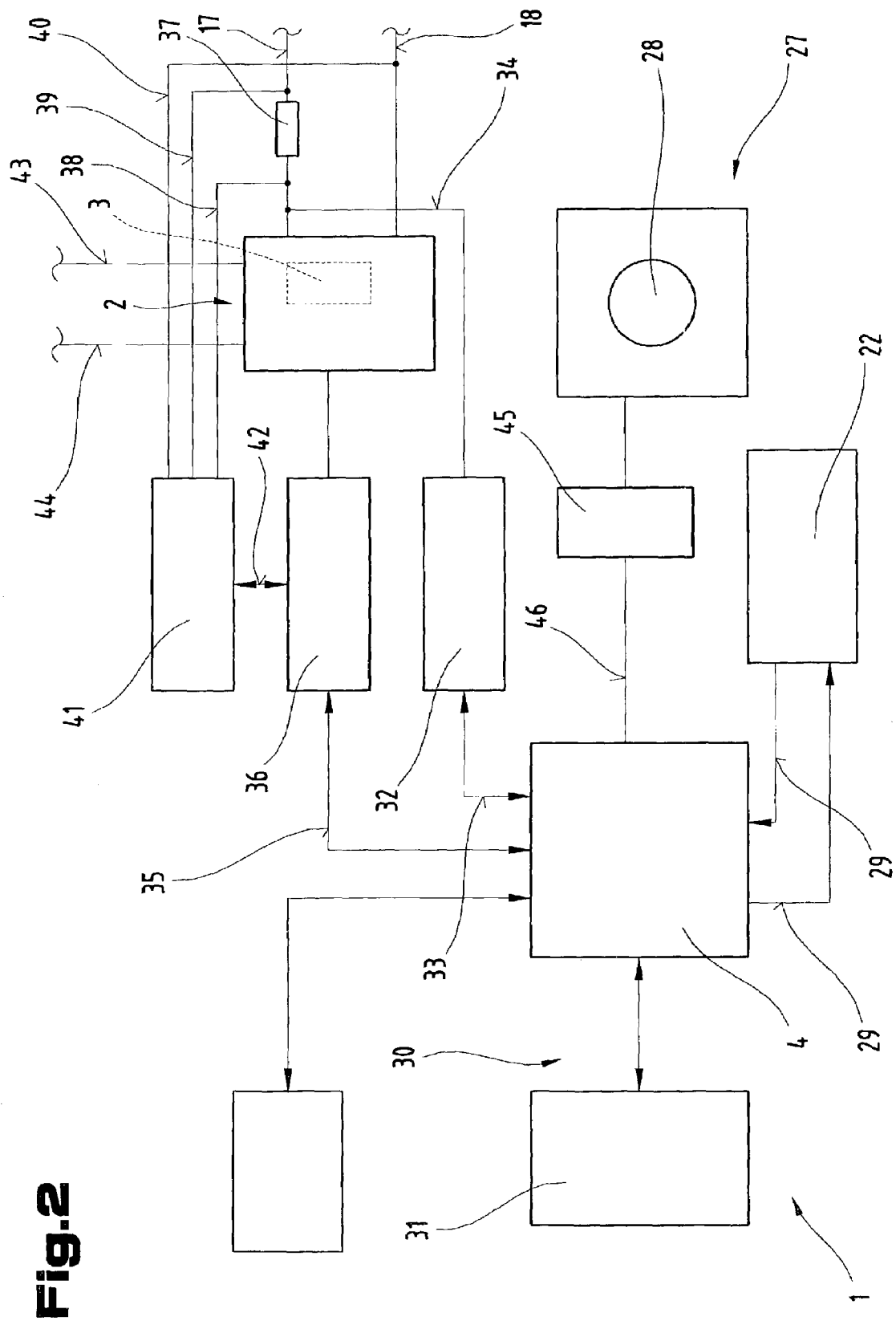
FIG. 2 is a simplified, schematic block diagram showing a configuration of a welding system and a welding device.

FIGS. 1 and 2 illustrate a welding system and a welding device 1 and a block diagram of the welding device 1, which may be used for a whole range of welding processes, e.g. MIG-MAG welding and TIG welding or electrode welding processes. Clearly, the solution proposed by the invention may be used with a current source or a welding current source or a battery charging device.

The welding device 1 has a current source 2 with a power component 3, a control system 4 and a switching element 5 co-operating with the power component 3 and control system 4. The switching element 5 or the control system 4 is connected to a control valve 6 incorporated in a supply line 7 for a gas 8, in particular an inert gas such as $CO_2$, helium or argon and such like, running between a gas storage 9 and a welding torch 10.

Furthermore, a wire feed device 11 such as commonly used for MIG-MAG welding may also be activated via the control system 4 in order to feed a welding wire 13 from a supply reel 14 through a supply line 12 into the region of the welding torch 10. Clearly, the wire feed device 11 could also be integrated in the welding device 1, in particular in the basic housing, in a manner known from the prior art, rather than used as an add-on device or being made up from additional components as illustrated in FIG. 1.

The current needed to strike an arc 15 between the welding wire 13 and a workpiece 16 is fed via a welding line 17 from the power component 3 of the current source 2 to the welding torch 10 and the welding wire 13, the workpiece 16 to be welded also being connected to the welding device 1, in particular to the current source 2, via another welding line 18 so that a current circuit can be established across the arc 15.

In order to cool the welding torch 10, the welding torch 10 can be connected via a cooling circuit 19, with an integrated flow indicator 20, to a fluid container, in particular a water container 21, so that the cooling circuit 19, in particular a fluid pump used to pump the liquid contained in the water container 21, can be activated when the welding torch 10 is switched on, thereby enabling the welding torch 10 and the welding wire 13 to be cooled.

The welding device 1 also has an input and/or output device 22, by means of which a whole range of settings can be entered and stored for welding parameters and operating modes of the welding device 1. The welding parameters entered at the input and/or output device 22 are then forwarded to the control system 4, from where they are applied to the individual components of the welding system and the welding device 1.

In the embodiment illustrated as an example here, the welding torch 10 is also connected to the welding device 1 and the welding system by means of a hose pack 23. The individual lines from the welding device 1 to the welding torch 10 are disposed in the hose pack 23. The hose pack 23 is connected by means of a connector device 24, known from the prior art, to the welding torch 10, whilst the individual lines in the hose pack 23 are connected to the individual contacts of the welding device 1 by means of connecting sockets and plug connectors. To relieve tension on the hose pack 23, the hose pack 23 is connected via a tension-relieving device 25 to a housing 26, in particular the basic housing of the welding device 1.

The welding device 1 also has an add-on module 27 for detecting persons by means of biometric physical characteristics. This add-on module 27 is connected to the control system 4 and the welding device 1 or the current source 2, as may be seen more clearly from the block diagram given in FIG. 2.

The add-on module 27 may be used to operate an anti-theft system and a method of setting, authorisations and allocating personalised welding settings, whereby user-defined data stored in a memory unit of the control system 4 can be loaded and the welding device 1 and the welding system or the current source can be automatically configured, controlled and regulated accordingly. Allocation by the control system 4 or the add-on module 27 is operated on the basis of detecting persons by means of biometric physical characteristics, such as an electronic fingerprint, voice recognition, iris recognition, recognition of facial shape, recognition of writing, etc., the detected data being forwarded to the control system 4 of the welding device 1 or the current source 2, so that a desired/actual comparison can be run by the add-on module 27 or the control system 4 of the welding device 1 or the current source 2 against data stored in a memory unit.

The add-on module 27 is a separate unit known from the prior art. Various add-on modules 27 may be used for detecting persons by biometric physical characteristics, such as a sensor 28, a micro-phone or a video camera, with the requisite electronics for detecting biometric physical characteristics on the basis of fingerprint recognition and/or voice recognition or iris recognition and/or recognition of facial shape and/or recognition of writing and/or similar.

The block diagram illustrates a configuration that is known from the prior art as such and will there be described only briefly. As may be seen from FIG. 2, the welding device 1 is configured with the control system 4, which is preferably a microprocessor controller or a micro-chip. Connected to an input of the control system 4 via lines 29 is the input and/or output device 22, by means of which the user can enter welding settings. Other inputs and outputs of the control system 4 are connected via a bus system 30, consisting of address and data lines, to a memory unit 31 in which all the data and desired values or welding programmes needed for the welding process are stored. It would also be possible for data needed for the add-on module 27 to be stored in this memory unit 31 so that a data exchange or a data transfer for the recognition of biometric physical characteristics can be run between the add-on module 27 and the memory unit 31 and control system 4.

In order to ignite the arc 15, the welding device 1 has a high-frequency generator 32, which is connected to the control system 4 by a line 33 so that it can be activated. The output of the high-frequency generator 32 is connected via a high-frequency line 34 to the welding lines 17, 18, in particular the welding line 17, so that the welding voltage can be overlaid with a high-frequency signal for igniting the art 15. Clearly, it would also be possible to integrate any other ignition system known from the prior art.

The control system 4 is also connected via one or more control lines 35 to the power component 3 in which the current source 2 is integrated, a digital process controller 36 being connected in between. The power component 3 or the current source 2 are preferably provided in the form of a current-inverter source. The welding torch 10 illustrated in FIG. 1 is connected via the welding lines 17, 18 to the power component 4 so that it can be supplied with current voltage, a measuring unit, in particular a shunt 37, being provided in one the welding lines 17, 18, in particular in the welding line 17, so that an actual value for the welding current and the welding voltage can be delivered via measurement lines 38 to 40 to a measuring device 41 or a digital-to-analogue converter.

This measuring device 41 or a digital-to-analogue converter is connected to the digital process controller 36 by means of lines 42, although only one of these lines 42 is illustrated in the drawing. Accordingly, the welding process can be controlled by the digital process controller 36, independently of the control system 4.

To apply current and voltage to the welding torch 10, the power component 3 is connected via supply lines 43, 44 to a public mains network, in particular a 230 V~ or a 400 V~ alternating voltage network, the power component 3 assuming the role of converting the supplied power into welding energy.

Also connected to the control system 4 and to the welding device 1 or a current source 2 is the add-on module 27 for detecting persons by biometric recognition of physical characteristics such as an electronic fingerprint, voice recognition, iris recognition, recognition of facial shape, recognition of writing, etc. The add-on module 27 is coupled with a standardised interface 45, which is connected to the control system 4 by lines 46 or a bus system. Consequently, the different add-on modules 27 for detecting a whole range of physical characteristics such as an electronic fingerprint, voice recognition, iris recognition, etc., can simply be used by fitting them to the welding device 1. All that is need is as software adjustment, which can be made by linking the add-on module 27 to the interface 45, for example. Every add-on module 27 may have its own memory unit for this purpose to enable automatic adaptation to the newly deployed add-on module 27 by means of a data transfer. The software could also be updated or modified via another interface, in particular a RS232 interface, although this is not illustrated, from a computer or PC, etc.

Using an add-on module 27 provides anti-theft protection and/or a method of assigning user authorisations for the welding device 1, for which purpose biometric physical characteristics can be used as a so-called code. This anti-theft security system also allows a corresponding identification code to be applied to the welding device 1 to deter unauthorised persons and to ensure that only authorised persons, such as a welding robot, can gain access to the welding device 1 or the welding system, in particular to specific data, functions and applications, on the basis of positive recognition by the add-on module 27. The add-on module 27 can also be fitted to different components of the welding system and the welding device 1, such as a front panel of the current source, a remote control system, control panel, welding torch 10, wire feed device 11, cooling device, hose pack 23, external holder, robot control cabinet or a robot console, etc., although the add-on module 27 must be able to run a data exchange or data transfer with the control system 4 of the welding device 1 directly or indirectly via another control system of a component. Clearly, several such add-on modules 27 may be assigned to a whole range of components of the welding system, in which case different add-on modules 27 may be used in the different components.

However, to enable persons to be recognized by the add-on module 27, a learning process must first be run, in other words a physical characteristic must be stored as a comparison sample or reference image. Storage may be in the memory unit 31 or in a memory unit in the add-on module 27 itself so that whenever the physical characteristic is read by the add-on module 27, a comparison can be run between the image just detected and the comparative sample, as a result of which access will be granted or denied. This being the case, the add-on module 27 may have its own control system, for example a microprocessor controller or a micro-chip and the comparison will be run directly in the add-on module 27.

Since the add-on module 27 used to record the biometric physical characteristics may be any add-on module 27 known from the prior art, the comparison procedure will not be explained in detail. The comparison procedure is preferably run by the add-on module 27 itself, which does not seed a user code, issued for every stored comparison sample, to the control system 4 unless the comparison is positive, in which case the control system 4 of the welding device 1 can assign or issue a user administration and user rights accordingly.

A user-defined programme, in particular a user profile, can then be launched by the control system 4, facilitating operation of the welding system and the welding device. This user profile may contain various items of information which can be used for manipulating the setting options on the welding device. Several user profiles are stored or one user profile for every user, which will release or lock the different setting options. Using user profiles allows several users to access one user profile, thereby enabling a user group to be set up.

When a user has been detected, in particular once the user code has been transmitted by the add-on module 27, the corresponding user profile is loaded by the control system 4 from the memory unit 31. If a user seeks to enter a setting for which he has no authorisation, the input and/or output device 22 will show an error message of the display.

The user profile may contain the information set out below, whilst corresponding authorisation tables and/or function or process sequences will be stored in the form of software programmes, i.e. when the user is recognised, a user-defined programme is launched, thereby facilitating operation of the welding device 1.

The user profile may contain details as to whether the user is a beginner, trainer, programmer on administrator, quality assurance inspector or welding engineer. The welding processes or specific current ranges, for example, may be released accordingly for welders authorised or trained to run the different welding processes, such as WIG, electrodes, MIG/MAG etc., or specific operating ranges or operating points, originating from the company data bank for example. Hardware options such as jobmaster, display, remote settings and remote operations may also be released.

The user profile enables corresponding administration activities to be run via the welding device 1 which are only issued or released to duly authorised persons, i.e. service information, adjustment functions, monitoring and/or checking of the weld tests and related documentation which can be loaded by the control system 4 via a network and administration of user-defined defaults stored for the respective user or a user group.

As a result of the user recognition system, at the end of an access session, the settings on the welding device 1 can be stored and the personal status when the machinery was switched off can be restored on a subsequent access. It also enables a full welding log to be kept for the welding device 1 as well as personnel-related data to be evaluated, for example for a performance-related payment system.

A personalised user profile of this type and hence an anti-theft system of this type means that key-operated anti-theft security measures involving locks and such like and keys that go missing no longer have to be used because the welding device 1 is secured by the biometric physical characteristics, requiring no additional elements. Another advantage resides in the fact that with a user profile system, the profiles can be stored and set up beforehand in a computer or PC in a user-friendly software programme and can then be forwarded to the welding device 1 by a simple data transmission. Releasing the welding device 1 on the basis of biometric physical characteristics also means that there is no way of manipulating access to the welding device 1.

The option of PC programming enables a portable or stationary computer to be linked to the welding device 1, such as a laptop, a personal computer (PC) or a networked computer system, for example, connected via an interface known from the prior art. A software programme issues user rights and detects the characteristics, after which user profiles can then be issued by selecting task-related default profiles or user-defined functions. Similarly, the different components or operating elements of the current source and the welding device 1 can be operated in parallel, for which purpose a corresponding add-on module 27 is provided on each component and is hard-wired or wirelessly connected to the control system 4.

However, it is also possible to use different add-on modules 27 for a whole range of physical characteristics on a whole range of components, since the recognition system and the comparison with a stored sample or reference image can be run directly by the add-on modules 27, thereby obviating the need for any complex exchange of data between the add-on module 27 and the memory unit 31 or control system 4.

The first time the welding system and the welding device 1 or the current source 2 is switched on, the allocation of user authorisations and the process of learning a physical characteristic of a user may be activated by entering a code or other any other form of access protection such as a key switch, fob, release code, mouse/keyboard, for example with fingerprint recognition, etc. This access authorisation or this access protection may be replaced by or extended to include the system of physical characteristic recognition after the first access. The welding device 1 and the welding system could naturally be connected to an in-house network on an existing central security management system or building entry control system, particularly one form which data and reference images can be accessed, which will obviate the need to run a learning process to store the biometric physical characteristics, i.e. the welding device 1 or the current source 2 will run a data exchange across a standard interface 45 and a computer network with a central security management system in which all personal data is stored. To this end, the user profiles could also be stored in this external access control system, in particular in the building entry control system, so that a data transfer can be run by the control system 4 with this system, whereby once the system is switched on and the user is recognised, all data and authorisations or releases will be available.

Another possibility is that when the current source and the welding device 1 are switched on for the first time, the welding system and the welding device 1 may be provided with job-related default functions, such as anti-theft protection, which could then be deactivated by selecting a hidden function, in particular a secret combination of operating procedures or inputting a code. This already allows user job-related rights to be allocated.

The sensor 28 and the add-on module 27 for detecting biometric physical characteristics may be configured as a PC add-on and/or via the current source sensor system, for example a robot box. This being the case, the add-on module 27 could be linked up to a computer or PC so that the leaning mode for recognising users on the user takes place initially on the computer, after which the add-on module 27 is connected to the control system 4 or another component of the welding system via the interface 45.

After the welding system and the welding device 1 have been switched on for the first time, a various requirements inherent in the anti-theft system can be setup. For example, the user may be prompted by display elements, such as LEDs, 7-segment elements or an LCD display, to enter a code or key in a secret combination immediately after switching the system on. Another option would be to set the system up so that the anti-theft security features or access detection are not activated by the add-on module 27 until one of the protected functions is selected. Naturally, another possibility would be for the system, in particular the welding device 1 or a computer to delete the authorisation so that this user would be prevented from switching the system on again.

It would also be possible for the data used for recognizing the user, in particular personal data or the access authorisations, to be treated anonymously, in which case a settings option will be provided by means of which the anonymity of the individual sets of personal data can be defined. Another option would be to secure or store the biometric physical characteristics memorised the first time the system was switched on to be held for a limited time only or on the basis of unrestricted access to the welding device 1. A significant advantage of this type of configuration or system is the fact that the user recognition system or personal recognition system must be run in order to retrieve specific functions, which means that the basic functions can be made available without the need for user detection whilst access to essential operating sequences or stored data can be reserved for authorised persons only.

The welding device 1 or the current source 2 may be set up in conjunction with the add-on module 27 for the purposes of detecting persons on the basis of biometric physical characteristics, for example an electronic fingerprint, voice recognition, iris recognition, recognition of facial shape, recognition of writing, etc., in particular using a fingerprint sensor, and can be so in such a way that the components for the welding device 1 and the fingerprint sensor are provided on a standard board or are provided directly by the welding processor, in particular the control system 4 of the welding device 1.

FIG. 3 is a block diagram of a welding device 1 designed for a whole range of welding processes. The welding device 1 has an add-on module 50 for detecting users and/or allocating authorisations, for example by means of a transponder system 51 and/or a magnetic card system and/or a chip card system and/or a bar code system and/or a memory system and/or a radio identification system or similar, designed to recognise an identification element. This being the case, an identifying mark or a code is stored in an identification element and the module (50) has means for reading this identifying mark or code.

The add-on module 50 is used to detect a code or an identifying mark of the identification element, after which the control system of the welding device sets the authorisations of different users and allocates personalised welding settings to a user. This being the case, stored personal data is loaded from a memory unit of the control system 4 depending on the code or identifying mark of the identification element and the welding device 1 and welding system or the current source 2 is automatically set up, controlled and/or regulated accordingly. A personal recognition system is preferably run via the transponder system 51, whereby the detected data is forward to the control system 4 or current source, after which a desired-actual comparison is run by the control system 4 or the current source 2 or the add-on module 50 against the data stored in a memory unit.

The add-on module 50 may be provided in the form of a unit known from the prior art, separate on integrated in the electronics of the welding device or a component of a welding device, i.e. if the add-on module 50 is integrated, for example, the requisite hardware components such as an induction loop in the case of a transponder system 51 or a magnetic stripe reader in the case of a magnetic card system or similar, are built into the system in order to record the identification code of the identification element, whereas software control of the add-on module 50 is handled by the control system 4 of the welding device 1 or a control system of any component of the welding device 1. This makes for a considerable saving in terms of components, such as another control system for example, in particular a microprocessor, a memory and other regulating or control components. Combining the system in this way, in other words the control system of the welding device and the add-on module, rules out any manipulation with a view to switching the welding device 1 on because when the components of the add-on module 50 are changed, the authorisations and identification codes are still stored in the welding device 1.

Accordingly, different add-on modules 50 can be used for the personal recognition system via the transponder system 51, in which case these add-on modules 50 might be a transmitter 52 and a receiver 53 with the requisite electronics for detecting or recording the data of an identification element, in particular a transponder 54 in the keeping the user of the welding device 1.

The identification element might be a transponder 54, a bank card, an authorisation card for an entry system, an automatic key with integrated transponder 54 for an entrance barrier or any magnetic or SIM or chip card and/or any other type of card, such as an identification card, with a bar code or a combination thereof. Consequently, standard identification cards may be used as a means of switching on and gaining authorisation for the welding device 1, which the user night also use for other applications, such as an entry control system or payment system, such as an automatic cash dispenser, obviating the need to carry around extra identification cards or identification elements. This has an advantage in that an identification element or an identification card of this type can be used for all the security systems on a same work site. This significantly simplifies administration, maintenance, etc., since every person need be issued with only a single identification code.

The identification element, in particular the transponder 54, is advantageously a passive component, i.e. does not have its own power supply, which means that the transponder 54 must be supplied with power by the add-on module 50, in particular the transponder system 51, in order to be able to read the identification code.

The power supply may be provided in the form of an induction loop, for example:

Depending on the type and design of the transponder 54 used, the add-on module 50 may be provided with a transmission and/or reception field for reading the transponder code. However, it would also be possible to provide a slot for inserting the transponder 54, in which case when the transponder 54 is inserted in the slot, the identification code, in particular the transponder code, is read in a manner similar to that used with magnetic card-reading devices or PIN-code-reading devices.

The configuration of the block diagram illustrated in FIG. 3 is otherwise the same as that illustrated in FIG. 2 and this drawing will therefore not be described in any further detail. For further details, reference should be made to the description of those functions and procedures relating to FIG. 2 that are the same as those used with the embodiment illustrated in FIG. 3, the difference being that identification is operated by means of an identification element, in particular an identification code, instead of by storing biometric physical characteristics.

A memory unit 31 is connected to inputs and outputs of the control system 4 via a bus system 30 consisting of address and data lines, where all the data and desired values or welding programmes needed for the welding process can be stored. Data for the add-on module 50 could also be stored in this memory unit 31, in which case a data exchange or data transfer would be run between the add-on module 50 and the memory unit 31 or control system 4 in order to recognise the transponder 54.

The add-on module 50 is coupled with a standard interface 45 connected to the control system 4 by means of lines 46 or a bus system. As a result, different add-on modules 50 may be used to detect different transponders 54 simply by modifying the fixtures of the welding device 1.

The add-on module 50 can be used to secure the welding device 1 against theft and/or for issuing user rights to it and the transponder of the user, in particular the identification code or transponder code, is used as the security code.

To enable the add-on module 50 to recognize a person, it must firstly be taken through a learning process, in other words a fixed identification code or transponder code must be stored as a comparative sample or reference code.

The reference code may be stored in the add-on module 50 or in the control system 4, so that whenever the transponder code is read, the read transponder code is compared with the reference code, on which basis access is granted or denied. Clearly, the add-on module 50 could be provided with its own control system for this purpose, in particular a microprocessor controller or a microchip. By preference, however, the reference code or identification code is stored in the memory unit 31 of the control system 4 since this will enable allocation of the individual authorisations and weldings settings or welding parameters for the permitted settings options as well as options for accessing the welding device 1 to be managed simultaneously, obviating a duplication of administration in the add-on module 50 and in the control system 4, i.e. the add-on module 50 merely picks up or detects the identification code and the evaluation, allocation., etc., is then handled by the control system 4 of the welding device 1 or another control system of a component of the welding device 1.

Another option is to run a part of this learning process on a job basis, setting up a general access authorisation for service engineers, for example. To this end, identification elements or transponders are set up for service personnel using specific transponder codes and these are then transferred to the add-on module 50 through the learning process along with the respective associated access rights. This ensures that service personnel will have priority access to the welding device 1, regardless of the access rights subsequently issued by and to users.

The first time the welding device 1 and the welding system or the current source 2 is switched on, the system may be set up so that a password has to be entered in order to issue user authorisations and run learning processes for the transponder system 51 or some other access protection might be used such as a key switch, fob, release code and such like. After the initial access and once the learning process for the transponder system 51 is complete, this access authorisation or additional protection can be dispensed with.

Another option is to link the welding device 1 and welding system to an in-house network in order to access an existing security administration system, e.g. an access control system to the building. In this case, the requisite learning processes for storing the reference code do not need to be run directly on the transponder system 51 of the welding device 1 and instead the reference code can be made available through the security administration system or the entry control system to the building across the standardised interface 45 via a data line, in particular a computer network.

Irrespective of whether a learning process for a reference code of the transponder 54 is run directly on the transponder system 51 or through an entry control system to the building, any rights can be allocated to this reference code and settings can be stored for specific persons.

A whole range of advantageous applications can be set up by networking one or more welding devices 1. For example, all data needed for identification purposes and/or issuing authorisations can be stored on a central computer, greatly facilitating maintenance of this data, since administration no longer has to be run separately on each welding device 1. To this end, the identification code picked up via the add-on module 50 can be transferred from a welding device 1 to this central computer, which will assume the task of checking the identity of the person and assigning the authorisation and/or the allocation of personalised welding data. The authorisation and personalised data are then transmitted across the network to the corresponding welding device 1, making all the requisite data and authorisations available to the user on this welding device 1.

The advantage of this is that if a plurality of welding devices 1 is run on one site, this data will not have to be stored in every welding device and can be centrally organised. Any changes which have to be made to the authorisations and personalised data can be made from this central computer, significantly reducing the maintenance needed for the welding devices 1.

A system of this type will be used by preference in large companies, for example in the automotive industry or in shipbuilding, where a very large number of welding devices 1 are used and not every person is allowed to operate welding processes of this type, on the grounds that special welding tests are needed for this purpose. In this situation, a major advantage or a system of this type is a welding test can be stored and whenever welding personnel access the system, one person will be able to run the relevant tested welding process on all welding devices 1, whereas if the welding devices 1 were not networked, the maintenance personnel would have to make changes to every welding device 1 on site, but central storage and networking can now be run on one component only, in particular the central computer, providing a simple means by which the welding devices can be updated the new conditions.

However, to allow special settings for a particular person to be stored in the central computer, all the data is sent via the network to the central computer, where it is stored so that when a welding process is needed again on any welding device 1 in the network, the user or person will be able to retrieve all the data and welding settings. For this to be possible, however, it is necessary to have a clear system of identifying the person and for this purpose the welding device 1 will be provided with an appropriate add-on module 50, in particular a transponder system 51. The user or person will therefore carry a corresponding identification element, in particular an identity card, a coded card or a transponder 54, with a clearly allocated identification number or identification code so that the person can be clearly identified or his identification code detected by the welding device 1 via the add-on module 50.

Furthermore, by networking one or more welding devices 1, the data and authorisations can be maintained from the central computer and the corresponding data and authorisations are supplied to the individual welding devices 1 via the network and can then be stored directly in the welding device. This will significantly reduce data transfers across the network.

Given the fact that production these days is increasingly operated on a to-order basis, it is necessary to be able to set up equipment to run different specifications or different welding processes within a short type. In order to reduce the time needed for this and the minimise the number of personnel needed for maintenance purposes, a system of this type, particularly with welding devices 1 of this type equipped with an add-on module 50 for detecting an identification code, will allow the welding device 1 to be set up automatically in the shortest possible time. For example, every product to be made on a production line, such as a motor vehicle body for example, can be provided with an identification element, in particular a transponder 54, so that at every station, in particular the welding station, the identification code of the associated welding device 1 can be detected and the welding settings corresponding to this identification code or product code automatically configured. This will enable a production line to be rapidly re-configured or modified to handle the most varied range of products, simply by issuing a corresponding identification element at the start of production.

Configuration, maintenance and monitoring can therefore all be handled by the central computer by networking the welding devices 1. In a production line of this type, the other production machines, for example a robot system, are also preferably equipped with an add-on module 50 of this type so that the entire production line can be adapted by means of a corresponding identification element, in particular the transponder 54.

Another possible application for which a welding device of this type 1 equipped with an add-on module 50 for detecting an identification code might be used is to monitor plants as a whole, for example via the central computer. The system can be set up so that all the devices can be viewed from the central computer and an identification code is dully assigned to those devices, enabling them to be switched on.

The transponder code or reference code of the transponder 54 is usually a multi-digit number. However, it would also be possible for the code to be an alphanumeric code or any other code known from the prior art.

It is also possible to use standard transponders 54 already programmed with a transponder code or freely programmable transponders 54, in which case a transponder code will be assigned to the transponder 54 prior to a learning process of the transponder system 51.

The transponders 54 allocated to service engineers, for example, may be transponders 54 of the programmable type, in which case several transponders 54 will always have the same transponder code, whereas transponders 54 issued to other users could be non-programmable transponders 54 which always have a unique transponder code.

Finally, for the sake of good order, it should be pointed out that the component groups and modules are only schematically illustrated in the drawings and all may be made up of component groups and modules known from the prior art.

Individual features of the embodiment may be combined with other features or may be construed in their own right as the subject matter of independent inventions.

Above all, the individual embodiments illustrated in FIGS. 1, 2; 3 may be construed as the subject matter of independent solutions proposed by the invention. The tasks and solutions relating to the invention may be found in the detailed descriptions of these drawings.

LIST OF REFERENCE NUMBERS

1 Welding device
2 Current source
3 Power component
4 Control system
5 Switching element
6 Control valve
7 Supply line
8 Gas
9 Gas storage
10 Welding torch
11 Wire feed device
12 Supply line
13 Welding wire
14 Supply reel
15 Arc
16 Workpiece
17 Welding line
18 Welding line
19 Cooling circuit
20 Flow indicator
21 Water container
22 Hose pack
24 Connecting device
25 Tension-relieving device
26 Housing
27 Add-on module
28 Sensor 29 Line
30 Bus system
31 Memory unit
32 High-frequency generator
33 Line
34 High-frequency line
35 Control line
36 Digital process controller
37 Shunt
38 Measuring line
39 Measuring line
40 Measuring line
41 Measuring device
42 Line
43 Supply line
44 Supply line
45 Interface
46 Line
50 Add-on module
51 Transponder system
52 Transmitter
53 Receiver
54 Transponder

What is claimed is:

1. Method for allocating personalized welding settings for a welding device or a welding system such that the welding device or the welding system can be configured, controlled or regulated according to the personalized welding settings, wherein the welding device or the welding system includes at least one control system coupled to a memory unit and wherein the memory unit is for storing personalized data including user profiles for respective authorized users of the welding device or the welding system, the method comprising:

detecting personal data using a personal recognition system at least partially contained in at least one add-on module, wherein the personal recognition system operates based on at least one of an electronic fingerprint recognition, voice recognition, iris recognition, recognition of a facial shape or recognition of writing;

forwarding the detected personal data to the at least one control system of the welding device or the welding system;

determining whether the detected personal data corresponds to an authorized user having personalized data stored in the memory unit and, if yes, identifying the authorized user as a first user;

when first user is identified, loading the at least one control system of the welding device or the welding system with a first user profile corresponding to the first user;

checking whether the first user profile contains information for manipulating at least one setting option on the welding device or the welding system; and releasing or locking the at least one setting option on the welding device or the welding system according to the first user profile.

2. Method as claimed in claim 1, wherein a desired/actual value comparison with data stored in the memory unit is run by the at least one add-on module or the at least one control system of the welding device or the welding system.

3. Method as claimed in claim 1, wherein the at least one add-on module is used as an anti-theft means, such that authorized persons are granted or denied access to specific data, functions and applications by the at least one control system.

4. Method as claimed in claim 1, wherein a user-defined application program, including a welding program which is preferred by the first user and pre-adjustable by the first user profile, is stored and set as a default for the detected personal data corresponding to the first user.

5. Method as claimed in claim 1, wherein personalized status data of the welding device or the welding system at a last shut-down of the welding device or the welding system by the first user are retrieved by the at least one control system, when the welding device or the welding system is activated or switched on again by the first user.

6. Method as claimed in claim 1, wherein a personalized welding log is kept in the memory unit by the at least one control system or in the at least one add-on module.

7. Method as claimed in claim 1, wherein a data transfer is run by the welding device or the welding system using a computer network via a standardized interface such that access to a central security administration system is provided, in which all personal data is stored.

8. Method as claimed in claim 1, wherein a password or user code is assigned to the personal data for an authorized user.

9. Method for allocating personalized welding settings for a welding device a welding system such that the welding device or the welding system can be configured, controlled or regulated according to the personalized welding settings, wherein the welding device or the welding system includes a control system coupled to a memory unit and wherein the memory unit is for storing personalized data including personalized welding settings for respective authorized users of the welding device or the welding system, the method comprising:

detecting an identification code, including a transponder code of a transponder, by an add-on module;

checking whether the identification code matches a user code or password of an authorized user having personalized data stored in the memory unit and, if yes, identifying the authorized user as a first user;

when the first user is identified, reading personalized welding settings allocated to the detected identification code from the memory unit; and granting the first user permission to use the welding device or the welding system only in accordance with the personalized welding settings allocated to the detected identification code.

10. Method as claimed in claim 9, wherein the add-on module is used as an anti-theft system, such that (i) access is granted to specific data, functions and applications for the first user, and (ii) access to or operation of specific data, functions and applications is denied whenever the detected identification code does not match a user code or password for an authorized user having personalized data stored in the memory unit.

11. Method as claimed in claim 9, wherein new identification codes including new transponder codes are, recorded and stored in the memory unit by means of a learning process of the add-on module.

12. Method as claimed in claim 11, wherein the learning process is run by a primary system connected to the welding device or the welding system.

13. Method as claimed in claim 12, wherein the primary system is a security administration system or entry control system of a building.

14. Method as claimed in claim 9, wherein a personalized or password-related or user code-related data log is kept by the add-on module.

15. Method as claimed in claim 9, wherein personalized status data related to a last shut-down of the welding device or the welding system by the first user are restored, when the welding device or welding system is activated or switched on again by the first user.

16. Method as claimed in claim 15, wherein the welding device or welding system is activated or switched on again using a transponder system and a transponder.

* * * * *

UNITED STATES PATENT AND TRADEMARK OFFICE
CERTIFICATE OF CORRECTION

PATENT NO. : 7,523,069 B1
APPLICATION NO. : 10/129447
DATED : April 21, 2009
INVENTOR(S) : Helmut Friedl et al.

It is certified that error appears in the above-identified patent and that said Letters Patent is hereby corrected as shown below:

On the title page, item [73] in the Assignee, delete "Fronium" and insert --Fronius--.
Column 5, line 45, delete "seed" and insert --send--.
Column 8, line 30, "forward" should read --forwarded--.
Column 11, line 10, delete "or" and insert --of--.
Column 14, line 56, "are, recorded" should read --are recorded--.

Signed and Sealed this

Thirty-first Day of August, 2010

David J. Kappos
*Director of the United States Patent and Trademark Office*